(12) United States Patent
Hiti et al.

(10) Patent No.: US 7,061,134 B2
(45) Date of Patent: Jun. 13, 2006

(54) METHOD AND SYSTEM FOR IMPROVED THERMAL MANAGEMENT OF A VOLTAGE SOURCE INVERTER OPERATING AT LOW OUTPUT FREQUENCY UTILIZING A ZERO VECTOR MODULATION TECHNIQUE

(75) Inventors: Silva Hiti, Redondo Beach, CA (US); Constantin C. Stancu, Anaheim, CA (US); Khwaja Rahman, Torrance, CA (US); Scott D. Downer, Torrance, CA (US); James M. Nagashima, Cerritos, CA (US); Eric R. Ostrom, Bellflower, CA (US)

(73) Assignee: General Motors Corporation, Detroit, MI (US)

( * ) Notice: Subject to any disclaimer, the term of this patent is extended or adjusted under 35 U.S.C. 154(b) by 74 days.

(21) Appl. No.: 10/632,257

(22) Filed: Aug. 1, 2003

(65) Prior Publication Data
US 2005/0024902 A1    Feb. 3, 2005

(51) Int. Cl.
*H02P 9/04* (2006.01)
*H02P 5/34* (2006.01)
(52) U.S. Cl. .......................... 290/44; 318/801; 363/41
(58) Field of Classification Search .................. 363/15, 363/16, 17, 36, 41, 46, 132, 127, 95, 98, 363/78; 818/801, 811; 290/43, 44, 55
See application file for complete search history.

(56) References Cited

U.S. PATENT DOCUMENTS

| | | | | |
|---|---|---|---|---|
| 4,833,584 A | * | 5/1989 | Divan | 363/37 |
| 6,313,602 B1 | * | 11/2001 | Arefeen et al. | 318/801 |
| 6,337,804 B1 | * | 1/2002 | Kea et al. | 363/132 |
| 6,643,149 B1 | * | 11/2003 | Arnet et al. | 363/41 |
| 6,856,038 B1 | * | 2/2005 | Rebsdorf et al. | 290/44 |

* cited by examiner

Primary Examiner—Rajnikant B. Patel
(74) Attorney, Agent, or Firm—Christopher DeVries

(57) ABSTRACT

The present invention includes a method for thermal management in a voltage source inverter. The method includes sensing a low output frequency condition, determining a zero vector modulation responsive to the sensed low output frequency condition, and applying the determined zero vector modulation to reduce thermal stress in the voltage source inverter. The step of determining the zero vector modulation responsive to the sensed low output frequency condition includes mapping an output voltage requirement to a space vector structure and determining state switching space vectors based on the mapped output voltage requirement. The step of determining the state switching space vector includes determining active state switching space vectors associated with the state switching space vectors, determining duty cycles for the active state switching space vectors based on the active state switching space vectors, and determining a duty cycle for at least one zero state switching space vector based on the determined duty cycles of the active state switching space vectors and a switching period.

7 Claims, 3 Drawing Sheets

METHOD AND SYSTEM FOR IMPROVED THERMAL MANAGEMENT OF A VOLTAGE SOURCE INVERTER OPERATING AT LOW OUTPUT FREQUENCY UTILIZING A ZERO VECTOR MODULATION TECHNIQUE

FIELD OF THE INVENTION

The technical field of this disclosure is voltage source inverters, and more particularly, thermal management of power switches within voltage source inverters.

BACKGROUND OF THE INVENTION

Voltage source inverters are increasingly utilized in many applications, such as, for example, motor drive systems for electric vehicles or hybrid-electric vehicles within automotive applications. In these applications, a voltage source inverter (VSI) may supply an alternating current (AC) dependant device, such as, for example, an AC motor.

Thermal management issues concerning power switches within the voltage source inverter (VSI) may arise when the VSI operates at low or zero output frequency, that is, the VSI is applying zero or low voltage across the phases while receiving a constant direct current (DC) link voltage, referred to as input voltage. When operating at low or zero output frequency, the average voltage produced by the VSI is low in comparison to the DC link voltage, while the output current might be the switch rated current.

Thermal management issues arise at zero or low output frequency due to slowly changing AC current. That is, under these conditions, a power switch in the VSI might be required to carry maximum rated current continuously or for a very long period, causing constant high power dissipation inside the power switch. This condition represents a worst-case operating condition for a switch in the VSI. A conventional solution is to time-limit the VSI operation at zero output frequency and full output current. Unfortunately, this conventional solution is problematic for electric and hybrid vehicle operation because it limits the time during which maximum torque can be applied to the electric motor during vehicle start.

It would be desirable, therefore, to provide a system that would overcome these and other disadvantages.

SUMMARY OF THE INVENTION

One aspect of the invention provides a method of thermal management within a voltage source inverter by sensing a low output frequency condition, determining a zero vector modulation responsive to the sensed low output frequency condition, and applying the determined zero vector modulation to reduce thermal stress in the voltage source inverter.

In accordance with another aspect of the invention, a computer readable medium storing a computer program includes: computer readable code for determining a zero vector modulation responsive to a low output frequency condition; and computer readable code for applying the determined zero vector modulation to reduce thermal stress in the voltage source inverter.

In accordance with yet another aspect of the invention, a system for thermal management in a voltage source inverter is provided. The system includes means for sensing a low output frequency condition. The system additionally includes means for determining a zero vector modulation responsive to the sensed low output frequency condition. Means for applying the determined zero vector modulation to reduce thermal stress in the voltage source inverter is also provided.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices.

DETAILED DESCRIPTION OF THE PRESENTLY PREFERRED EMBODIMENT

Figure 1:
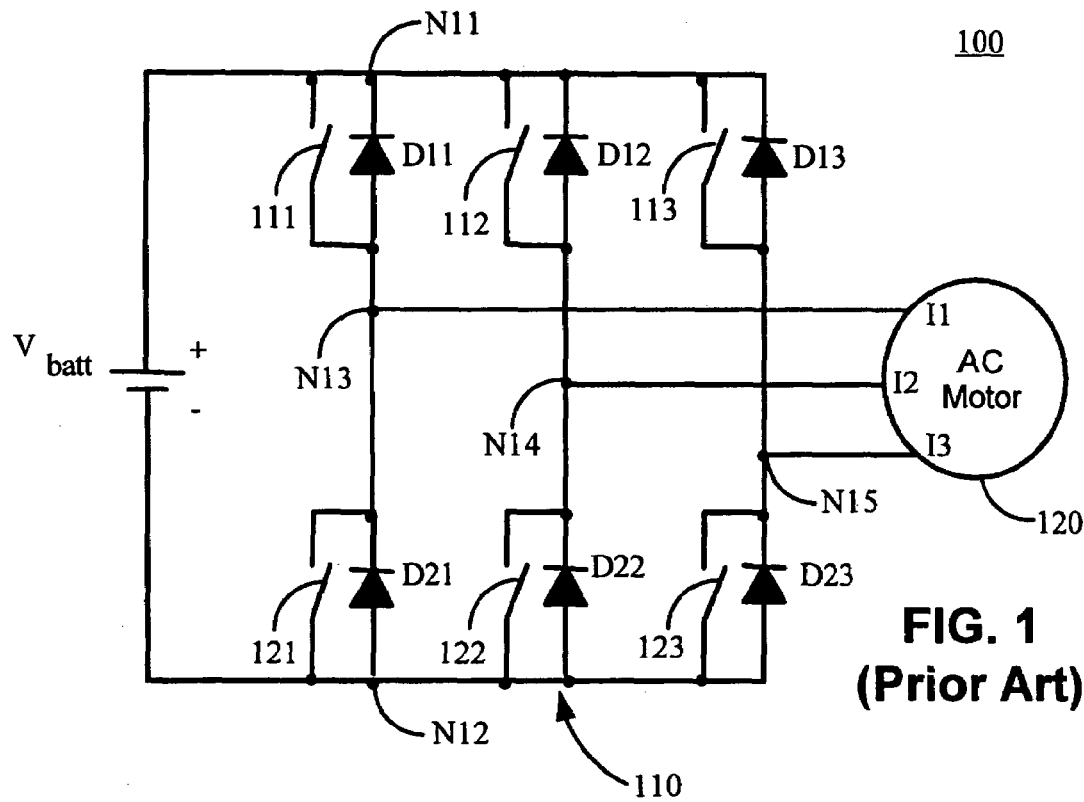
FIG. 1 is a schematic diagram illustrating a conventional motor drive system.

FIG. 1 is a schematic diagram illustrating a conventional motor drive system 100 including a voltage source inverter 110 and an AC motor 120. Voltage source inverter 110 is a conventional voltage source inverter and includes power supply $V_{batt}$, diodes ($D_{11}$–$D_{23}$), and switches (111–123). Nodes ($N_{11}$–$N_{15}$) are additionally included for illustrative purposes.

Power supply $V_{batt}$ includes a positive terminal (+) and a negative terminal (−). The positive terminal (+) is coupled to node $N_{11}$ and the negative terminal (−) is coupled to node $N_{12}$. Diode $D_{11}$ includes a cathode coupled to node $N_{11}$ and an anode coupled to node $N_{13}$, diode $D_{12}$ includes a cathode coupled to node $N_{11}$ and an anode coupled to node $N_{14}$, and diode $D_{13}$ includes a cathode coupled to node $N_{11}$ and an anode coupled to node $N_{15}$. Diode $D_{21}$ includes a cathode coupled to node $N_{13}$ and an anode coupled to node $N_{12}$, diode $D_{22}$ includes a cathode coupled to node $N_{14}$ and an anode coupled to node $N_{12}$, and diode $D_{23}$ includes a cathode coupled to node $N_{15}$ and an anode coupled to node $N_{12}$.

Each diode ($D_{11}$–$D_{23}$) has an associated switch (111–123) located in parallel to the associated diode. The combination of a diode and an associated switch is called a power switch. The power switch, formed in this way, can carry current in two directions and can block the voltage in one direction.

Two power switches are grouped together to form an inverter branch. In an example and referring to FIG. 1, three branches are formed within voltage source inverter 110.

The switches (111–123) provide a means of controlling current flow within a portion of each branch of voltage source inverter 110. Switches (111–113) are called upper switches. Switches (121–123) are called lower switches. In one embodiment and detailed in FIG. 2 below, switches (111–123) are software controlled utilizing a high frequency pulse width modulated methodology.

AC motor 120 includes three terminals ($I_1$–$I_3$). Terminal $I_1$ is coupled to node $N_{13}$, terminal $I_2$ is coupled to node $N_{14}$, and terminal 13 is coupled to node $N_{15}$. AC motor 120 receives an AC voltage input from voltage source inverter 110 and produces a mechanical output based on the AC input.

In operation, voltage source inverter 110 includes six current bi-directional, voltage unidirectional power switches with one switch within each branch open while the other switch within the branch is closed. Closing the switch allows current to flow within a portion of the branch. In an example and referring to FIG. 1, closing switch 111 allows current to flow from power supply $V_{batt}$ to Terminal $I_1$ via node $N_{13}$. Alternatively, closing the switch could allow current to flow in the opposite direction from Terminal $I_1$ to supply $V_{batt}$, via node $N_{13}$, depending upon motor operating conditions.

A high frequency pulse width modulation (PWM) technique is utilized to control the per-cycle average, output voltage magnitude and frequency. The power switches operate at a constant switching frequency, $f_{sw}$, while the switch duty cycles are modulated to produce three-phase voltages of desired magnitude and frequency.

Figure 2:
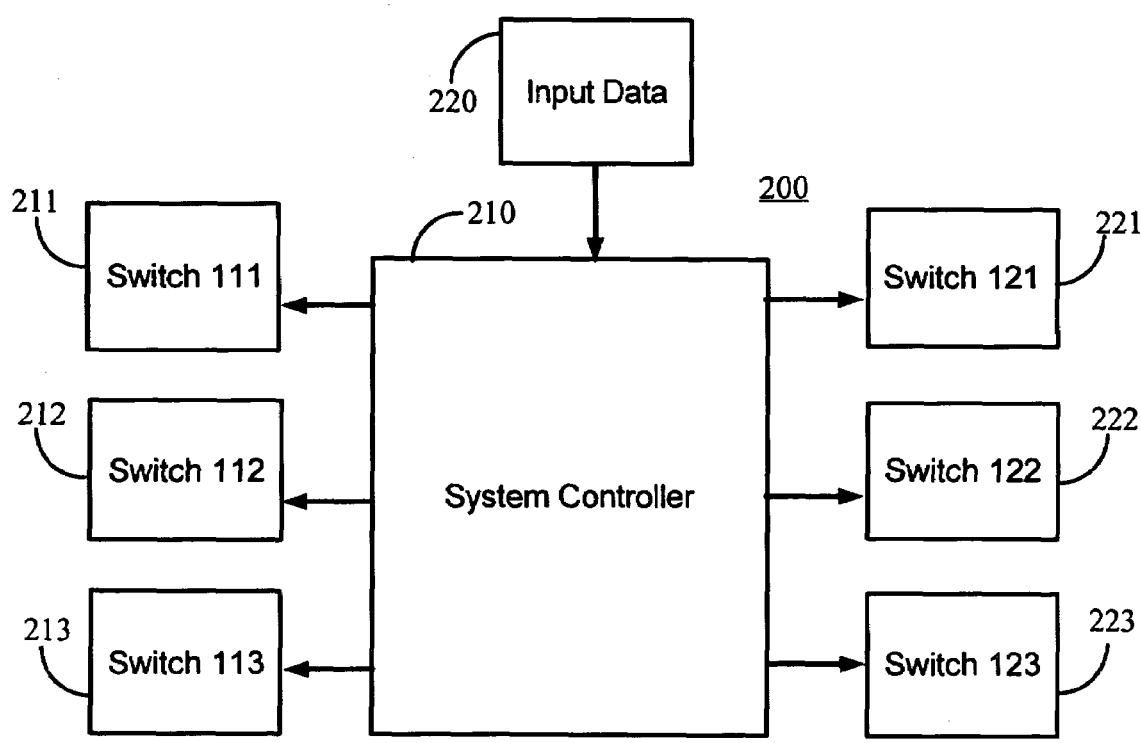
FIG. 2 is a block diagram illustrating a voltage source inverter control circuit according to an embodiment of the present invention.

FIG. 2 is a block diagram illustrating a voltage source inverter control circuit 200 according to an embodiment of the present invention. Voltage source inverter control circuit 200 includes system controller 210, switch controllers (211–223), and a data input 220. In one embodiment, each switch controller controls an associated switch within a voltage source inverter.

System controller 210 is a control device designed to monitor and receive data from various sources, such as, for example data input 220, process the received data and transmit control signals to switch controllers (211–223) based on the received processed data. In one embodiment, system controller 210 includes hardware and software necessary to receive a pulse width modulated signal, including instructions for operation of power switches, and producing individual power switch control signals based on the received pulse width modulated signal, as known in the art.

In an example and referring to FIGS. 1 and 2, system controller 210 is implemented as a processing unit and includes accompanying devices, such as PROMs, and software programming enabling the processing unit to conduct operations. Additionally, system controller 210 includes a database having a space vector structure, such as in Table 1 below, defining a switching space vector associated with switches within each branch for any given switching combination. In this example, the database is implemented as a lookup table, as known in the art.

Switch controllers (211–223) are control devices designed to receive control signals from system controller 210 and implement the control signals within an associated power switch. In one embodiment, switch controllers (211–223) include hardware and software necessary to implement power switch control signals received from system controller 210. In an example and referring to FIG. 1, each switch controller (211–223) controls an associated power switch combination. In this example, switch controller 211 provides a power switch control signal to the power switch combination. Similarly, the remaining switch controllers each provide a power switch control signal to the associated power switch combination.

TABLE 1

| Vector | STATE | Branch 1 | Branch 2 | Branch 3 |
|---|---|---|---|---|
| $V_0$ | Zero | 0 | 0 | 0 |
| $V_1$ | Active | 1 | 0 | 0 |
| $V_2$ | Active | 1 | 1 | 0 |
| $V_3$ | Active | 0 | 1 | 0 |
| $V_4$ | Active | 0 | 1 | 1 |
| $V_5$ | Active | 0 | 0 | 1 |
| $V_6$ | Active | 1 | 0 | 1 |
| $V_7$ | Zero | 1 | 1 | 1 |

Table 1 is a table associated with a voltage source inverter, such as, for example voltage source inverter 110 and system controller 210 in FIG. 1 above. Table 1 includes switching space vectors ($V_0$–$V_7$) associated with power switches within each branch (Branch 1–Branch 3) for any given switching combination. In Table 1, each branch represents two current bi-directional, voltage unidirectional power switches with one switch within the branch open while the other switch within the branch is closed. The switching space vectors ($V_0$–$V_7$) are created when the three phase-to-neutral voltages sum-up to zero by allowing association of each switching space vectors ($V_0$–$V_7$) with a specific inverter switch state.

In one embodiment, a voltage source inverter having three branches, each branch including two power switches, results in eight possible switching space vector ($V_0$–$V_7$) combinations. In an example and referring to FIGS. 1 and 2 and Table 1, a "0" represents the upper switch of the indicated branch as the open switch while the lower switch within the branch is closed. A "1" represents the lower switch of the indicated branch as the open switch while the upper switch within the branch is closed. In this example, switching space vector $V_1$ indicates that Branch 1 (switches 111 and 121) is configure with switch 111 closed and switch 121 open, Branch 2 (switches 112 and 122) is configure with switch 122 closed and switch 112 open, and Branch 3 (switches 113 and 123) is configure with switch 123 closed and switch 113 open.

Table 1 additionally includes a status column for each state. The status column indicates either a "Zero" or an "Active" status. An active status indicates that a switching configuration resulting in a net voltage being applied to the load, such as, for example the AC motor 120 of FIG. 1 above. A zero status indicates a switching configuration resulting in the load being effective shorted.

Figure 3:
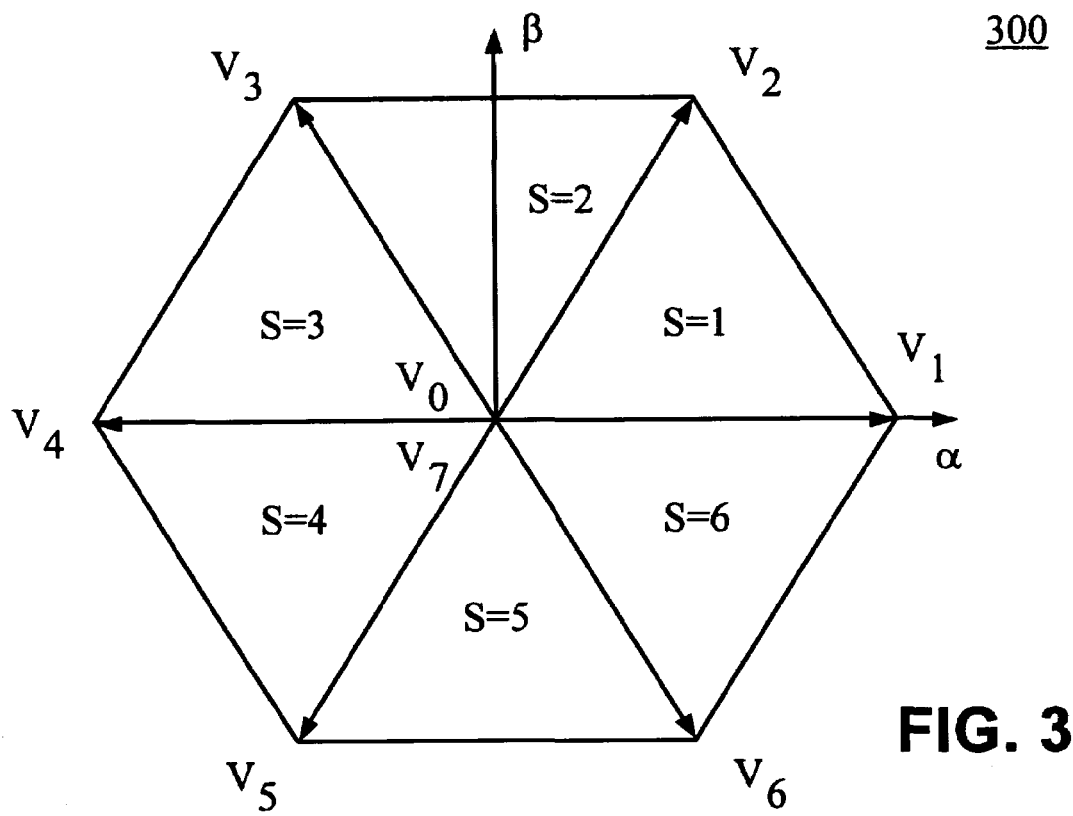
FIG. 3 is a hexagonal space vector structure diagram illustrating potential combinations of inverter switch states of a system controller, illustrated in FIG. 2, according to an embodiment of the present invention.

FIG. 3 is a hexagonal space vector structure diagram 300 illustrating potential combinations of inverter switch states of the system controller 200, illustrated in FIG. 2 and included within Table 1, according to an embodiment of the present invention. In FIG. 3, the active states from Table 1 are utilized to form the vertices of the hexagonal space vector structure diagram and the zero states are located within the center of the hexagon. Area lying between the different active states, called a space vector area, and within the hexagon boundaries is labeled, such as, for example "s=1" based on one of the switching space vectors ($V_0$–$V_7$) that defines the area.

In use, any voltage requirement falling within the hexagon boundaries of the hexagonal space vector structure diagram 300, can be produced, on a per-cycle basis, by a combination of the switching space vectors. Producing the voltage requirement is accomplished by adjusting a combination of active states and zero states duty cycles, within a period, and is detailed in FIG. 4 below. In an example and referring to FIG. 3, a voltage requirement falling within space vector area "s=1" can be produced by adjusting a combination of active states ($V_1$ and $V_2$) and zero states ($V_0$ and $V_7$) duty cycles, within a given period $T_s$, to achieve the required voltage.

Figure 4:
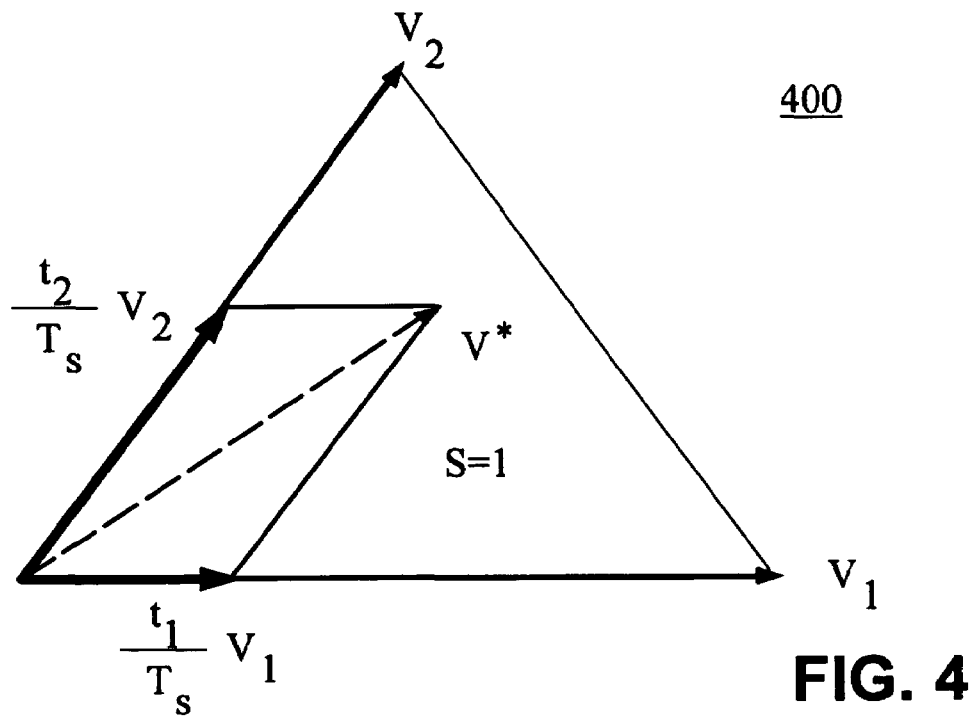
FIG. 4 is a space vector area diagram illustrating a portion of the hexagonal space vector structure diagram, illustrated in FIG. 3, and including a mapped reference vector according to an embodiment of the present invention.

FIG. 4 is a space vector area diagram 400 illustrating a portion of the hexagonal space vector structure diagram 300, illustrated in FIG. 3 above, and including a reference vector V* according to an embodiment of the present invention. The reference vector V* represents a mapped power requirement. In one embodiment and referring to FIGS. 3 and 4, mapping the reference vector V* to the space vector area diagram 400 allows determination of the space vector area, such as, for example the space vector area s=1 of FIG. 3.

In this embodiment, determination of the space vector area allows determination of duty cycles ($t_1$–$t_6$) associated with active state switching space vectors ($V_1$–$V_6$) that define the space vector area within a given switching period $T_s$. Once duty cycles ($t_1$–$t_6$) for active state switching space vectors ($V_1$–$V_6$) that define the space vector area are determined, duty cycles ($t_0$ and $t_7$) for zero state switching space vectors ($V_0$ and $V_7$) can be determined.

In an example and referring to FIG. 4, the total duty cycle ($t_0$+$t_7$) of zero state switching space vectors ($V_0$ and $V_7$) is equal to the duration of the period $T_s$ less the duty cycles ($t_1$ and $t_2$) for the switching space vectors ($V_1$ and $V_2$) and is expressed in Equation 1 as:

$$d=(t_0+t_7)/T_s=1-[(t_1+t_2)/T_s] \quad (1)$$

In this example, either zero state switching space vectors ($V_0$ or $V_7$), or a combination of both zero state switching space vectors ($V_0$ and $V_7$) can be used during the switching period $T_s$ to achieve the completion of the switching period $T_s$ without affecting the average value of the output voltage delivered to the load. In one embodiment, utilization of either zero state switching space vectors ($V_0$ or $V_7$) or utilization the combination of zero state switching space vectors ($V_0$ and $V_7$) allows optimization of pulse width modulation (PWM) sequencing, such as, for example to achieve minimal switching losses, minimal voltage distortion, minimal current distortion, and the like.

In the present invention, utilization of the zero state switching space vectors ($V_0$ or $V_7$) allows distribution of conduction losses among VSI power switches in the branch carrying the largest current.

At low output frequencies the reference vector V* includes a small magnitude. In this embodiment, the zero vector duty cycle d for reference vector V* can be expressed in Equation 2 as:

$$d=(t_0+t_7)/T_s>>1-[(t_1+t_2)/T_s] \quad (2)$$

When PWM is utilized so that the highest phase current is not switched, power dissipation for the power switch carrying the largest amount of current $I_{max}$, is equal to the maximum conduction power losses $P_{cond}$ ($I_{max}$). The power dissipation can be reduced when conduction loss of the switch carrying the peak current for the duration of the zero vector duty cycle d is greater than the amount of energy needed to turn the switch on and off ($E_{sw}$) at the peak current and the switching frequency $f_{sw}$. In an example and referring to FIG. 4, zero vector duty cycle d is the duty cycle do for zero state switching space vector $V_0$. In this example, the expression can be expressed in Equation 3 as:

$$[P_{cond}(I_{max}) \cdot d_0] > [E_{sw} \cdot f_{sw}] \quad (3)$$

Utilization of either zero state switching space vectors ($V_0$ or $V_7$) or utilization the combination of zero state switching space vectors ($V_0$ and $V_7$) is called zero vector modulation (ZVM). The zero state switching space vectors ($V_0$ or $V_7$) are selected periodically at a zero vector modulation frequency $f_{zvm}$ and zero vector modulation duty cycle $d_{zvm}$, in order to reduce power dissipation in the switch carrying the largest current. A zero vector modulation frequency $f_{zvm}$ of 100 Hz utilization a zero vector modulation duty cycle $d_{zvm}$ of 0.5 are examples of zero vector modulation (ZVM) implementation.

When zero vector modulation (ZVM) is utilized, average power dissipation for a ZVM period, $T_{zvm}$, for the power switch most stressed can be expressed in Equation 4 as:

$$P_{cond}(I_{max})-d_{zvm}[P_{cond}(I_{max}) \cdot d_0-E_{sw} \cdot f_{sw}] \quad (4)$$

where ZVM duty cycle $d_{zvm}$ is the complementary zero state duty cycle $d_7$ for zero state switching space vector $V_7$, i.e the power dissipation for the switch carrying the largest current is reduced. However, the total losses for the VSI branch carrying the largest current are increased and can be expressed in Equation 5 as:

$$2 \cdot (d_{zvm})(E_{sw}) \cdot (f_{sw}) \quad (5)$$

Based on the above equation, utilizing a smaller complementary ZVM duty cycle $d_{zvm}$ will result in a reduction of power dissipation of the most stressed power switch while producing a small increase of total inverter losses. In an example and referring to FIG. 4, a ZVM frequency $f_{zvm}$ of 10 hertz (Hz) utilized with a duty cycle do for zero state switching space vector $V_0$ of 0.7, and utilizing a ZVM duty cycle $d_{zvm}$ of 0.65 for zero state switching space vector $V_7$ results in negligible switching losses within a MOSFET inverter. In this example, zero vector modulation (ZVM) reduces power dissipation within the power switch carrying the largest amount of current thereby allowing the control of junction temperatures.

Figure 5:
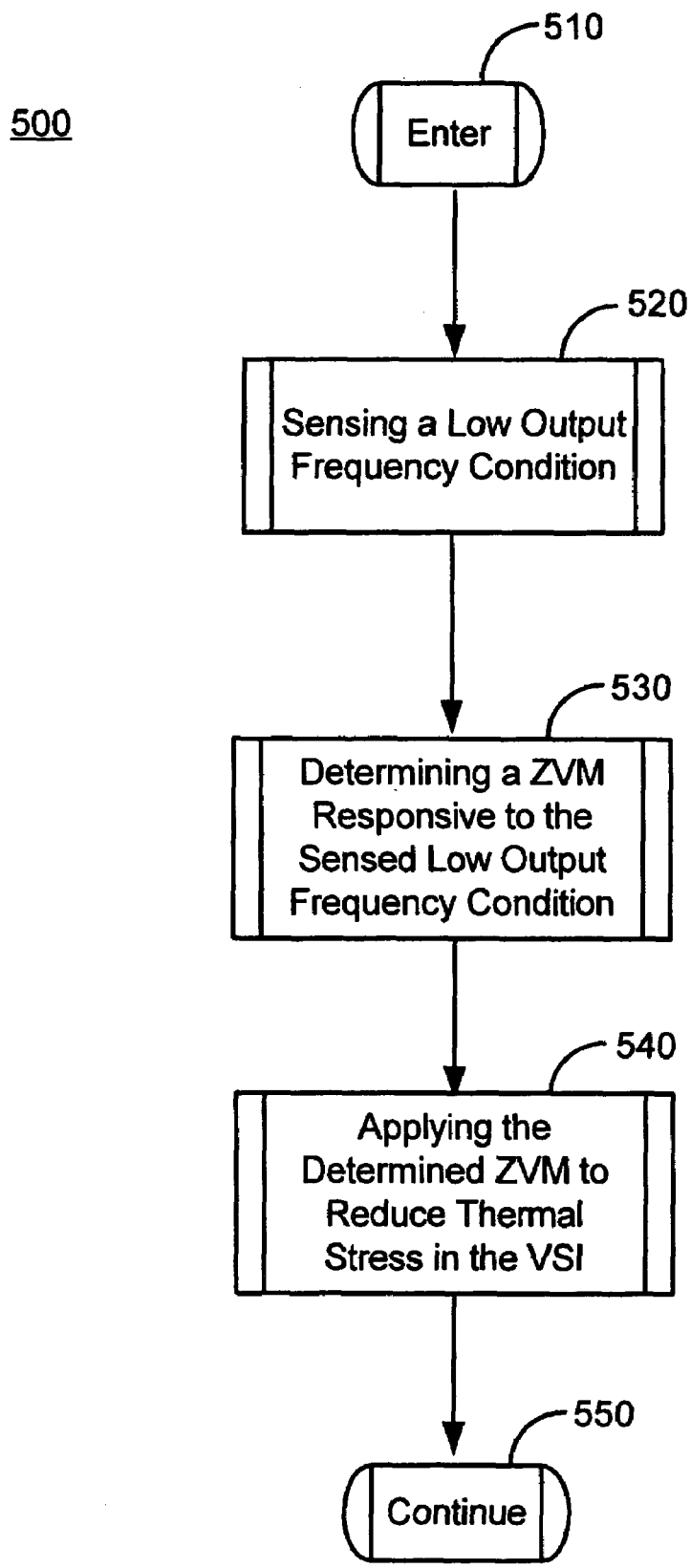
FIG. 5 is a flow diagram illustrating a method for providing improved thermal management in a voltage source inverter utilizing zero vector modulation according to another embodiment of the present invention.

FIG. 5 is a flow diagram illustrating a method for providing improved thermal management in a voltage source inverter utilizing zero vector modulation according to another embodiment of the present invention. FIG. 5 details an embodiment of a method 500 for controlling thermal build-up within power switches in a voltage source inverter (VSI). Method 500 may utilize one or more concepts detailed in FIGS. 1–4, above.

Method 500 begins at block 510. First, a low output frequency condition is sensed (Block 520). In one embodiment, low frequency conditions occur when an electric motor is rotating at a very low speed or when the motor is at stand-still. In an example, the very low speed or stand-still conditions occur during vehicle start-up, such as, in an electric vehicle or during engine cranking in a hybrid vehicle starter-generator application.

Next, a zero vector modulation responsive to the sensed low output frequency condition is determined (Block 530). In one embodiment, a power requirement, called a reference vector, associated with the sensed low output frequency condition is mapped to a space vector area within a space vector structure diagram. In an example and referring to FIGS. 3 and 4, a voltage requirement falling within space vector area "s=1" can be produced by adjusting a combination of active state switching space vector's ($V_1$ and $V_2$) and zero state switching space vector's ($V_0$ and $V_7$) duty cycles, within a given period $T_s$, to achieve the required voltage. In this example and referring to Table 1, each active and zero state switching space vector includes three associated branch configurations defined within the table and detailed above.

Then, the determined zero vector modulation is applied to reduce thermal stress within the voltage source inverter (VSI) (Block 540). In one embodiment, the space vector area including the reference vector is defined by two active state switching space vectors. A combination of the use of active state switching space vectors for a predetermined time (active state duty cycle) within an operating period produces the reference vector. The remaining time (operating period less the active state duty cycle) is allocated for the use of a combination of zero state switching space vectors.

In an example and referring to FIG. 4, the duty cycles ($t_1$ and $t_2$) for the switching space vectors ($V_1$ and $V_2$) are determined based on the reference vector V*. The total duty cycle ($t_0+t_7$) of zero state switching space vectors ($V_0$ and $V_7$) is equal to the duration of the period $T_s$ less the duty cycles ($t_1$ and $t_2$) for the switching space vectors ($V_1$ and $V_2$). In this example, either zero state switching space vectors ($V_0$ or $V_7$), or a combination of both zero state switching space vectors ($V_0$ and $V_7$) can be used during the switching period $T_s$ to achieve the completion of the switching period $T_s$ without affecting the average value of the output voltage delivered to the load. Power is then delivered to the load based on the duty cycles of the active and zero state switching space vectors that are associated with specific branch configurations in Table 1, above. The method ends at block 550.

The above-described system and method for improved thermal management in a voltage source inverter is an example system and method. The system and method for improved thermal management in a voltage source inverter illustrate one possible approach for improving thermal management in a voltage source inverter. The actual implementation may vary from the package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

We claim:

1. A method of thermal management in a voltage source inverter, the method comprising:

sensing a low output frequency condition corresponding to zero or low voltage across phases in the voltage source inverter while the voltage source inverter is receiving a constant DC link voltage;

determining a zero vector modulation to the sensed low output frequency condition; and applying the determined zero vector modulation to reduce thermal stress in the voltage source inverter.

2. The method of claim 1, wherein determining the zero vector modulation responsive to the sensed low output frequency condition comprises:

mapping an output voltage requirement to a space vector structure; and determining state switching space vectors based on the mapped output voltage requirement.

3. The method of claim 2, wherein the magnitude of a combination of state switching space vectors is equal to the magnitude of the output voltage requirement.

4. The method of claim 2, wherein determining the state switching space vectors comprise:

determining active state switching space vectors associated with the state switching space vectors;

determining duty cycles for the active state switching space vectors based on the active state switching space vectors and the mapped output voltage requirement; and determining a duty cycle for at least one zero state switching space vector based on the determined duty cycles of the active state switching space vectors and a switching period.

5. The method of claim 4, wherein the duty cycle for the at least one zero state switching space vectors is selected from the group consisting of: a first zero state duty cycle, a second zero state duty cycle, and a combination of the zero state duty cycles.

6. The method of claim 1, wherein applying the determined zero vector modulation to reduce thermal stress in the voltage source inverter comprises:

applying a net voltage from the inverter to a load when active state switching space vectors are utilized; and applying a shorted voltage from the inverter to the load when zero state switching space vectors are utilized.

7. A system for thermal management in a voltage source inverter, the system comprising:

means for sensing a low output frequency condition corresponding to zero or low voltage across phases in the voltage source inverter while the voltage source inverter is receiving a constant DC link voltage;

means for determining a zero vector modulation responsive to the sensed low output frequency condition; and means for applying the determined zero vector modulation to reduce thermal stress in the voltage source inverter.

* * * * *